United States Patent
Lee et al.

(10) Patent No.: US 10,379,226 B2
(45) Date of Patent: Aug. 13, 2019

(54) COOPERATIVE RECEIVER SYSTEM WITH MOBILE TO MOBILE ASSISTANCE

(71) Applicant: iPosi, Inc., Denver, CO (US)

(72) Inventors: Richard M. Lee, Denver, CO (US); Christopher Neil Kurby, Streamwood, IL (US); Eric Derbez, Vancouver (CA)

(73) Assignee: iPosi, Inc., Denver, CO (US)

( * ) Notice: Subject to any disclaimer, the term of this patent is extended or adjusted under 35 U.S.C. 154(b) by 0 days.

(21) Appl. No.: 15/574,946

(22) PCT Filed: Jul. 6, 2017

(86) PCT No.: PCT/US2017/040940
§ 371 (c)(1),
(2) Date: Nov. 17, 2017

(87) PCT Pub. No.: WO2018/009693
PCT Pub. Date: Jan. 11, 2018

(65) Prior Publication Data
US 2018/0284290 A1    Oct. 4, 2018

Related U.S. Application Data

(60) Provisional application No. 62/359,320, filed on Jul. 7, 2016.

(51) Int. Cl.
| | |
|---|---|
| *G01S 5/02* | (2010.01) |
| *G01S 19/12* | (2010.01) |
| *G01S 19/21* | (2010.01) |
| *G01S 19/46* | (2010.01) |
| *G01S 19/51* | (2010.01) |
| *G01S 19/22* | (2010.01) |

(52) U.S. Cl.
CPC ............ *G01S 19/46* (2013.01); *G01S 5/0289* (2013.01); *G01S 19/12* (2013.01); *G01S 19/21* (2013.01); *G01S 19/51* (2013.01); *G01S 19/22* (2013.01)

(58) Field of Classification Search
CPC ........ G01S 19/46; G01S 5/0289; G01S 19/12; G01S 19/21; G01S 19/24; G01S 5/02
USPC .................................................... 342/357.29
See application file for complete search history.

(56) References Cited

U.S. PATENT DOCUMENTS

| | | | |
|---|---|---|---|
| 6,748,324 B2 * | 6/2004 | Patwari | G01S 5/02 340/988 |
| 8,634,849 B2 | 1/2014 | Jovicic et al. | |
| 2007/0226530 A1 * | 9/2007 | Celinski | G06F 1/12 713/500 |
| 2011/0234454 A1 | 9/2011 | Mathews et al. | |
| 2011/0250904 A1 | 10/2011 | Valletta et al. | |

(Continued)

OTHER PUBLICATIONS

International Preliminary Examination Report on Patentability dated Jan. 9, 2019, PCT/US2017/040940, Iposi, Inc. (Year: 2019).*

*Primary Examiner* — Frank J McGue
(74) *Attorney, Agent, or Firm* — Holzer Patel Drennan

(57) ABSTRACT

Location of a device within a monitored environment with compromised communication with ranging communication nodes. Specifically, an intermediate device previously located by communication with ranging communication nodes is provided to provide a ranging signal to a device to be located. The device to be located may in turn use a ranging signal received from communication with the previously located device and one or more ranging communication nodes to resolve a location.

7 Claims, 16 Drawing Sheets

(56) References Cited

U.S. PATENT DOCUMENTS

| | | | |
|---|---|---|---|
| 2011/0285589 A1* | 11/2011 | Bull | G01S 5/0242 |
| | | | 342/387 |
| 2012/0098700 A1* | 4/2012 | Diggelen | G01S 19/45 |
| | | | 342/357.28 |
| 2014/0029701 A1* | 1/2014 | Newham | H04L 7/041 |
| | | | 375/340 |
| 2014/0370912 A1* | 12/2014 | Kurby | H04W 56/00 |
| | | | 455/456.1 |
| 2015/0063375 A1* | 3/2015 | Tzeng | H04J 3/0673 |
| | | | 370/512 |

* cited by examiner

COOPERATIVE RECEIVER SYSTEM WITH
MOBILE TO MOBILE ASSISTANCE

RELATED APPLICATIONS

This application is a National Phase Entry under 37 U.S.C. 371 of PCT Application No. PCT/US17/40940 entitled "COOPERATIVE RECEIVER SYSTEM WITH MOBILE TO MOBILE ASSISTANCE", which was filed on Jul. 6, 2017, which claims priority to U.S. Provisional Patent Application No. 62/359,320 filed on Jul. 7, 2016 entitled "COOPERATIVE RECEIVER SYSTEM WITH MOBILE TO MOBILE ASSISTANCE", the entirety of which is incorporated by reference herein.

FIELD

The field of the present disclosure generally relates to positioning systems for determining a location of a device.

GLOSSARY

BOC Binary Offset Code used in the Galileo GNSS system
GNSS global navigation by satellite system
GPS Global Position System
ENU East North Up local coordinate system
IEEE Institute of Electrical and Electronics Engineers
L1 C/A code GPS signal at 1575.42 MHz
L1 C Civilian use signal from GPS
L5 C code GPS signal at 1176.45 MHz
LOS Line of sight
LTE Long Term Integration 3GPP
MHz megahertz
PTP Precision Time Protocol
RF radio frequency
Rx receive
SNR signal to noise ratio
SV GNSS space vehicle or satellite
RTK Real Time Kinematic, a technique for precise navigation
WGS84 World Geodetic System developed in the 1980s

BACKGROUND

The United States Government and the governments of other countries/regions have installed and continue to maintain satellite constellations to provide location determining capability in their respective countries/regions. The Global Positioning System (GPS) is the US version of such Global Navigation Satellite System (GNSS). Throughout this disclosure, the generic term GNSS, the specific term GPS, or the combination GPS/GNSS may be used and such references shall refer to any such system, including GPS, GLONASS (Russian), Galileo (European), Indian Regional Navigation Satellite System (IRNSS), BeiDou-2 (Chinese), or other such comparable system.

Accordingly, many modern electronic and consumer devices include a GNSS receiver that can determine the absolute position of the device (in latitude, longitude, and altitude relative to a global coordinate system) via the GNSS system. GNSS receivers determine their position to high precision (within a few meters) by receiving time signals transmitted along a line-of-sight by radio (e.g., RF signals) from each "visible" GNSS satellite. Receipt of a sufficient number of signals (e.g., four or more) also allow the electronic receivers to calculate the current local time to high precision, which allows for time synchronization without the use of costly high precision oscillators.

One problem is that GNSS systems require a direct path (from each satellite used in a location and time synchronization solution) to the GNSS receiver in order to compute an optimum solution. In traditional GNSS systems, at least three simultaneous direct path signals from a corresponding number of space vehicles must be received to compute a solution if absolute GPS time is known at the receiver. However, rarely does the receiver have access to a high precision time source (e.g., a synchronized and highly precise oscillator), in which case four simultaneous GNSS signals may be required to provide for determination of placement in three dimensions and to correct for any timing bias at the receiver.

In outdoor environments, where there are no obstacles (e.g., on the open highway) this is easily realized. Further, in some light building structures (e.g., residential houses composed largely of wood) the GNSS signals are (1) only mildly attenuated, so that the received signal strength is above the sensitivity of the GNSS receiver, and (2) have an ideal, direct, and thus un-delayed path from the satellite to the receiver as seen in FIG. 1. In this case the signal rays are undistorted in time; that is, they have the same propagation time as a true line-of-sight (LOS) path and they can be used to provide an accurate location for the receiver.

However, in some environments such as heavy urban environments where a building may be embedded among a cluster of buildings, a direct signal ray may not exist from all of the requisite number satellites to determine a location and provide time synchronization. FIG. 2 shows a receiver located at a corner of a floor of a building, the building being in a homogenous cluster of buildings of equal size and spacing for illustration purposes.

In this case the receiver has a direct LOS signal from SV1 on the side with the least obstruction to the satellite. On the side facing SV2, the direct ray is attenuated below the sensitivity of the receiver. There is also a reflected ray from SV2 which necessarily is an elongated ray (because the distance traveled by the ray is greater than the distance between SV2 and the receiver. The elongated ray will introduce an error into the location estimate.

Present technology provides no solution for GNSS location in a cluster of buildings. Rather the locations of points to be located are done via manual and physical survey methods, which are laborious and costly.

SUMMARY

In view of the foregoing, it is presently recognized that a plurality of receivers may be located within or adjacent to a building to provide communication and location services to devices located within communication range of the receivers. The plurality of receivers may have a positioning system receiver and other communication means for RF communication with other devices beside a GNSS SV or the like. Such receivers may be referred to herein as receivers, nodes, communication nodes, or the like. In each instance, the receiver may have both GNSS communication capacity and other communication capacity (e.g., using a data network protocol such as those described in detail below) unless stated otherwise. The area in which the receivers are capable of communication may be referred to as the monitored environment.

A plurality of receivers may be located within or adjacent to a building. In turn, those receivers may be operative to determine the location of each of the receivers of the system (i.e., the nodes in the system may be self-locating) and an orientation of each of the receivers relative to global coordinate system. For example, cooperative receivers may be provided in the manner discussed in U.S. patent application Ser. No. 14/635,873 entitled "GNSS COOPERATIVE RECEIVER SYSTEM" filed on Mar. 2, 2015, the entirety of which is incorporated by reference herein.

Use of a cooperative receiver system for determination of a location of either a node within the receiver system (i.e., self-location) or a further device to be located with the cooperative receiver system may require that the location and the orientation of each node in the cooperative receiver system be determined. While the '873 Application describes one approach for determination of location and orientation of a cooperative receiver system, alternative approaches presented herein may provide advantages in relation to processing overhead requirements.

Specifically, approaches contemplated herein may utilize a plurality of cooperative receivers within a cooperative receiver system that receive positioning system signals (e.g., from a GNSS SV or the like). While any one of the receiver nodes may not individually receive a sufficient number of signals for location of any given one of the receivers, the signals from a plurality of or all of the receivers may be aggregated for use in determining a position of the system in its entirety. In turn, each of the plurality of cooperative receivers of the system may provide any positioning system signals received for aggregation to determine a location of the system. This aggregation may be used to locate the system to a first order of accuracy, which may be refined using later processing as will be described in greater detail below.

An orientation of the system may also be determined. For example, each node in the cooperative receiver system may be operative to determine the relative locations of the nodes of the cooperative receiver system (e.g., by way of RF ranging or the like). For this purpose, one of the communication nodes may be designated as an anchor node. Another of the nodes may be designated as a rover node. Preferably, the anchor node and the rover node have at least two common SV views from which the anchor and the rover nodes both receive positioning signals. That is, preferably the anchor node and the rover node are operative to receive positioning system signals from at least two of the same satellites in a given epoch. In turn, a vector defined between the anchor node and the rover node may be solved for using the common observables (e.g., the GNSS signals received at each respective node from the same satellites). Use of the observables received by the anchor node and the rover node in a common epoch may allow for determining a solution for the vector extending between the anchor note and the rover node. Once the vector between the anchor node and the rover node is known, the orientation of the system in its entirety may be resolved as the relative positions of the various nodes may also be determined as described above.

As will be described in greater detail below, use of common satellite observables for the anchor and rover node may allow for simplification of the computation needed to arrive at a solution for the vector extending between the anchor node and the rover node. Specifically and in contrast to the approach described in the '873 Application that uses a joint processing technique, because the anchor node and the rover node may be operative to receive satellite signals in a common epoch from common satellites, bias values for the given positioning system signals in the given epoch may cancel or otherwise be accounted for such that the processing needed to solve for the vector between the anchor node and the rover node may be maintained relatively simple even when observables over a great number of epochs are processed.

Also contemplated herein are improved techniques for use of cooperative receiver nodes of a cooperative receiver system to locate a device within a monitored environment served by the cooperative receiver system. Accordingly, accurate location and orientation of the cooperating receivers may facilitate further location-based functionality for devices associated with or in communication with the located receivers. For instance, one or more of the receivers may be in operative RF communication with a device to be located within the monitored environment.

Receivers contemplated herein may include small cell communication nodes, VoIP telephones, network infrastructure, or other devices. Furthermore, the receivers may be associated with communication nodes that may further provide location determination for devices within a monitored environment. For instance, in an embodiment, the cooperative receivers may be associated with communication devices operative to communicate (e.g., by way of RF signals) within and throughout a monitored environment. In turn, other devices within the monitored environment (e.g., mobile devices, etc.) may communicate with the cooperative receivers for location determination of the other devices within the monitored environment. This may be useful to facilitate location-based services for the devices even when located indoors or in other environments that may present difficulty with direct reception of GNSS signals at the device itself. One particular non-limiting example of a location based service may be location reporting for emergency calls originating from devices within the monitored environment.

Despite the improved ability to locate a device within a monitored environment using cooperative receivers, it may be that devices within the monitored environment are still incapable of communication with a sufficient number of the cooperative receivers of a cooperative receiver system for determination of a location of the device within the monitored environment. A device may require ranging signals from a given minimum number of the cooperative receivers to accurately determine a location using multilateration techniques. For instance, for trilateration a minimum of three ranging signals may be used. However, due to attenuation of the ranging signals, noise, or other interference, a device within the monitored environment may not be operative to obtain the necessary number of ranging signals from the cooperative receivers.

In turn, the present disclosure provides an approach whereby a previously located first device within the monitored environment (e.g., a mobile device capable of communication with a requisite number of cooperative receivers in the monitored environment to determine the mobile device's location using multilateration) may be operative to assist in the location of a second device that has limited connectivity with the cooperative receivers. Specifically, the previously located first device may communicate with the second device having limited connectivity to the cooperative receiver system to provide a ranging signal for use in determining the location of the second device. For instance, the second device may use ranging signals from two cooperating receivers along with a ranging signal from the previously located first device to derive a location for the second device.

Furthermore, it is contemplated herein that time synchronization between two cooperating nodes may be established by way of an intermediate device within the monitored environment (e.g., a mobile device within the monitored environment). For instance, in normal operation, the cooperating nodes may solve for a time value using an over-constrained system that is operative to receive sufficient location signals (e.g., GNSS signals) to derive a time reference. Additionally or alternatively, the cooperative receivers may synchronize local clocks via wireless communication of RF timing signals and/or wired communication (e.g., using an IEEE 1588 protocol). However, communication directly between cooperative devices may be limited due to, for example, attenuation or noise introduced within the monitored environment. In this case, each of a plurality of cooperative nodes may each be operative to communicate with an intermediate device such as a mobile device within the monitored environment. As such, the cooperative receivers may communicate with the intermediate device to synchronize cooperative receivers based on known time of flight from a first cooperative receiver to the intermediate device and a known time of flight from the intermediate device to a second cooperative receiver. In turn, an intermediate device may be used to synchronize receivers in a cooperative system described herein even in the absence of direct communication between the receivers to be synchronized.

As described above, the cooperative receivers may be operative to determine a location relative to a global coordinate system (e.g., WGS84 or the like). Accordingly, the cooperative receivers may operate as discussed in U.S. patent application Ser. No. 14/635,873 entitled "GNSS COOPERATIVE RECEIVER SYSTEM" filed on Mar. 2, 2015, the entirety of which is incorporated by reference herein. Specifically, the cooperative receivers may utilize a method for a GNSS receiver to more accurately determine the position of the GNSS receiver, based in part on signals received from one or more GNSS satellites. The method may include determining the distance from a first GNSS receiver to each of one or more other GNSS receivers of the system. This may include use of techniques using communication among the receivers to determine the distance between each of a plurality of receivers in a system. Additionally or alternatively, use of externally received GNSS signals or other positioning signals may be utilized to determine the distance between each receiver in a system.

In the cooperative system, each GNSS receiver of the system may generate pseudoranges and correlation values associated with one or more GNSS satellites. In turn, the method may include collecting pseudoranges and correlation values from each of the first GNSS receiver and the one or more other GNSS receivers of the system. From the pseudoranges, correlation values, and determined distance to each of the one or more other GNSS receivers, a best solution for the position of the first GNSS receiver may be generated (e.g., using mathematical approaches that reduce residual errors in each given observation). Specifically, the pseudoranges collected from any one given individual receiver of the system may be insufficient to determine a location of the receiver. In turn, it may be the collective processing of the pseudoranges from the more than one receiver that allows for determination of the location of the collective system.

As described above, the determining of the distance between GNSS receivers of the system may be performed cooperatively by the first GNSS receiver and the one or more other GNSS receivers. This may include RF ranging, wired ranging, or other (e.g., including the use of an intermediary device for ranging or time synchronization as described above). The distance determining may allow the relative geometry of the GNSS receivers to be determined. The method may further include determining which of the receivers is best able to receive GNSS signals from a first one of the GNSS satellites, may further include determining which of the receivers is best able to receive GNSS signals from a second one of the GNSS satellites, and may further include determining the relative geometry of the GNSS receivers based at least in part on which receiver is best able to receive GNSS signals from a first one of the GNSS satellites.

The method may further include determining the position of each of the one or more other GNSS receivers, in addition to determining the position of the first GNSS receiver. The determining of the positions of the group of cooperative GNSS receivers may include determining the distance between each one of the cooperative GNSS receivers in the group and every other one of the cooperative GNSS receivers in the group. Moreover, the determining of the position of the other GNSS receives may include determining an orientation of the receivers relative to a global coordinate system.

The determining of the positions of the group of cooperative GNSS receivers may include selecting one of the GNSS receivers to be an anchor receiver. In turn, at least one other receiver in the system may be designated as a rover receiver. In turn, the method may include determining the position of each of the cooperative GNSS receivers in the group. A residual error may be determined from that determining operation. In turn, an iterative approach that includes rotating the positions of each of the cooperative GNSS receivers in the group about an axis passing through the position of the anchor receiver may be used to determine a residual error from each of a plurality of rotated positions. The method may include comparing the residual errors from the different sets of positions for the different rotational positions of the receivers of the system and selecting an optimal position based upon the comparison.

That is, the positions of each of the cooperative GNSS receivers in the group may be rotated to multiple positions about the axis and a residual error may be determined for each such multiple position, wherein the comparison is made of the residual errors from each of the multiple positions, and the selection is made based on that comparison. A geodetic system may be used that has the anchor receiver as the origin of the geodetic system. The geodetic system may be defined relative to a plane tangent to a vector from the center of the Earth to the anchor receiver. The geodetic system may use true north as a reference. The geodetic system may use an arbitrary vector as a reference. Alternatively or additionally, the position (e.g., including absolute location and relative orientation) may be determined relative to a global coordinate system.

Also disclosed is a method for determining the location and/or orientation of a GNSS receiver including solving for a vector from a first GNSS receiver to a second GNSS receiver. The first GNSS receiver may determine its location from signals from multiple GNSS satellites. From the location of the first GNSS receiver and from the determined vector, the location of the second GNSS receiver may be determined. For instance, two GNSS receivers of the system may be chosen. The receivers may be chosen based on a determination of the two nodes of the system that have the most common views of satellites or most common reception of other positioning signals. This may provide the best geometric diversity for more accurate determination of the vector. In turn, pseudoranges from each of the two nodes to be located may be used to calculate the vector. For instance, an approach using joint processing as described herein may be used. Alternatively, a least squares regression analysis may be used in relation to the pseudoranges to calculate the vector. It has been found that even with highly constrained visibility, use of a least squares regression for determining the vector between two modules has yielded very accurate results. In turn, this approach may be particularly useful in dense urban environments with very limited satellite views.

Each of the first and second GNSS receivers may have a clock, and wherein the two clocks are synchronized. Each of the first and second GNSS receivers may have a clock, and wherein the two clocks are not synchronized. The first GNSS receiver may be located in the same building as the second GNSS receiver. The first GNSS receiver may be located in a different building from the second GNSS receiver.

DETAILED DESCRIPTION

Figure 1:
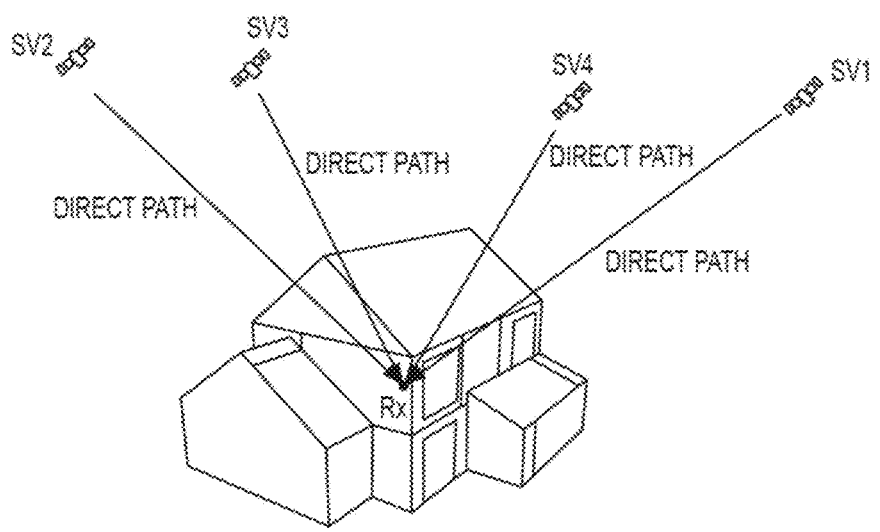
FIG. 1 is an illustration of a residential building with the receiver therein that has only lightly attenuated rays from GNSS satellites.
Figure 2:
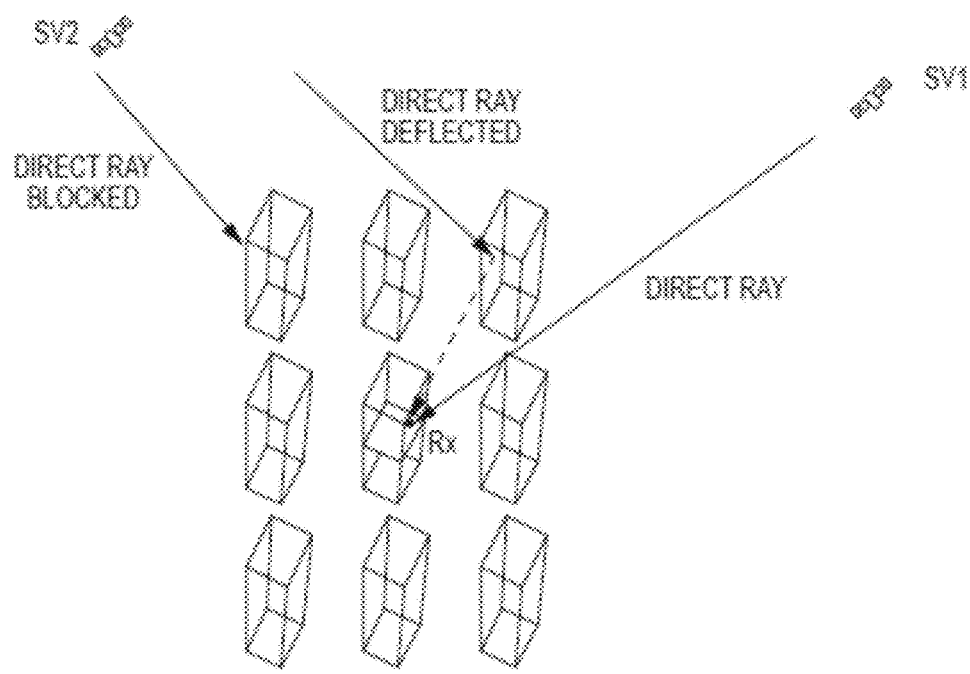
FIG. 2 is an illustration of an urban cluster of buildings that prevent one or more receivers from receiving direct rays from one or more satellites.

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

As discussed briefly above, it may be advantageous to provide location services to a device within an environment to provide accurate location determination for a given device within a monitored environment. Specifically, devices within a given monitored environment may have limited communication capability with positioning systems such as GNSS space vehicles or the like. In turn, traditional approaches to use of GNSS for determining the location of devices within the monitored environment may be limited.

In this regard, and as described above, the use of location determination modules (e.g., including GPS receivers and associated processing capabilities) have become common place in many consumer and enterprise devices. By leveraging such location determination modules, a device may facilitate a multitude of applications for location based services that may include, for example, emergency location services, verification of device locations, provision of locale specific information, among other location based benefits afforded by determination of a device location.

As further discussed above, it may be difficult or impossible for a device to obtain sufficient positioning system signals (e.g., GPS signals) to arrive at an accurate location in certain environments. For instance and as illustrated above, in dense urban areas or in certain buildings, GPS signals may be attenuated, reflected, or otherwise subject to noise that prevents accurate determination of location by a device in such an environment.

As such, it is presently contemplated that such environments may be served by systems that operate to determine the location of receivers relative to the interior of a building or other monitored environment where positioning signals may be difficult to obtain at a device to be located. Accordingly, the receivers of a system may first be located. In turn, a device within the monitored environment served by the receivers may also be located. As the location and orientation of the system of receivers may be located relative to a global coordinate system, the location of a device within the environment served by the system may also be determined relative to the global coordinate system. In turn, a device within the monitored environment may be located in a global coordinate system such that the device may be located as if it were located using GPS despite the fact that the device may be incapable of receiving sufficient GPS signals for location of the device.

Such a receiver system used to provide location determination services and absolute time synchronization to a monitored environment may comprise components of a larger communication network. For example, while current implementations of data networks are provided using traditional cellular communication towers (e.g., including 3G, 4G, LTE, WiMAX, or other data network technologies), an emerging paradigm for provision of data networks involves use of small cell nodes to form the data network. Such nodes generally include low-power radio access nodes with a smaller range than traditional high-power cellular access nodes (i.e., macrocells) currently in use. Small cells may include femtocells, picocells, and/or microcells. In general, such small cells may facilitate radio communications with devices to provision the data network. The protocol employed by such small cells may be diverse and varied and may include, for example, GSM, CDMA, LTE, WiMAX, Wi-Fi (802.11), or other current or future radio protocols. Such protocols may further benefit from absolute time synchronization as facilitated in a cooperative receiver system. LTE, for instance, must be synchronized within 1.5 micro seconds of GPS time.

In the context of the present disclosure, small cells may incorporate positioning system receivers (e.g., GPS receivers). In turn, and as will be discussed in greater detail herein, a cooperative system comprising small cells that also include GPS receivers may be operative to collectively determine a location and orientation of the system relative to a local and/or global coordinate system. In turn, a given node of the cooperative receiver system may include a positioning system receiver (e.g., a GPS receiver) and a small cell communication device. In turn, each node of the cooperative receiver system may be located. Moreover, an orientation of a plurality of nodes of the cooperative receiver system may also be determined. In turn, the cooperative receiver system may provide location determination capability to devices within an environment served by such small cell nodes.

Accordingly, a given monitored environment may include a plurality of communication nodes that may be operative to communicate with a device in the monitored environment to determine the location of the device (e.g., relative to a local and/or global coordinate system). In at least some embodiments, the communication nodes may be operative to determine (i.e., self-determine) the respective locations and orientation of the various communication nodes (e.g., utilizing a cooperative receiver approach described in greater detail below). Accordingly, it may be that a plurality of communication nodes each having a known location are provided throughout the monitored environment that may be utilized to provide processing for location of a device within a monitored environment (e.g., using multilateration).

With reference to FIGS. 17-20, the operation of such a cooperative receiver system 100 that may be utilized to locate a device 112 within a monitored environment 110 is depicted. Specifically, in FIG. 17, an exemplary approach for the location of the device 112 within the monitored environment 110 of a cooperative system 100 is depicted. Within the monitored environment 110, there may there may be a plurality of communication nodes (e.g., communication node 102, communication node 104, communication node 106, and communication node 108). The various communication nodes 102-108 may be at known locations within the monitored environment 110 (e.g., the communication nodes 102-108 may correspond with GNSS receivers described below such that each communication node 102-108 may be located according to any technique described below for location of a GNSS receiver in a cooperative system or traditional location of the GNSS receivers). Furthermore, the entire system 100 may be oriented relative to a global coordinate system such that the absolute location of the device 112 within the monitored environment 110 relative to the global coordinate system (e.g., Earth latitude/longitude coordinates and altitude) may be determined.

In any regard, the communication nodes 102-108 may be operative to communicate with the device 112 to be located. In an embodiment, the device 112 may be a mobile device such as a smart phone, cell phone, tablet, laptop computer, or other mobile device that may be disposed in the monitored environment 110. For instance, the first communication node 102 may communicate a ranging signal 120 with the mobile device 112. Additionally, the communication node 104 may communicate a ranging signal 122 with the mobile device 112, the communication node 106 may communicate a ranging signal 124 with the mobile device 112, and the communication device 108 may communicate a ranging signal 126 with the mobile device 112. In turn, use of the plurality of ranging signals (e.g., ranging signals 120-126) in a multilateration approach may be utilized to provide a location of the mobile device 112 with respect to the communication nodes 102-108. In an embodiment, a trilateration approach is used. For example, if using observed time difference of arrival (OTDOA) techniques (e.g., in the LTE standard), a minimum of three nodes may be utilized to provide a two dimensional location provided on an assumed flat floor (e.g., an assumed or known floor of a building).

In addition to the communication nodes 102-108 being operative to communicate ranging signals to the device 112, the communication nodes 102-108 may also facilitate data communication to the device 112. That is, the communication nodes 102-108 may facilitate access by the device 112 to a data network. As such, the ranging signals described above that are exchanged between the device 112 and the communication nodes 102-108 may be dedicated ranging signals, data network traffic, or a combination of either.

Figure 17:
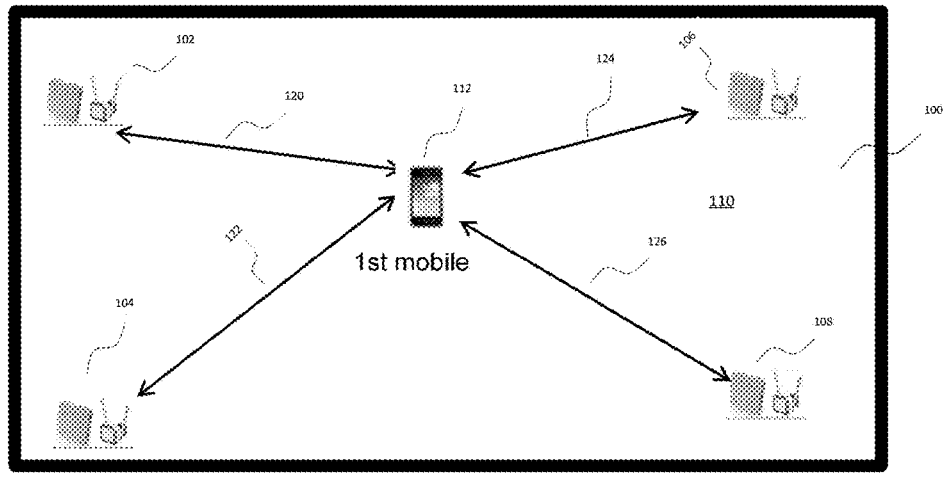
FIG. 17 is an illustration of use of cooperative receivers to locate a mobile device.

As may be appreciated in the example depicted in FIG. 17, in order to locate a device 112 within the monitored environment 110 utilizing multilateration, a given minimum number of ranging signals (e.g., three ranging signals if employing trilateration) from respective ones of the communication nodes 102-108 may be used to accurately locate the device 112. For example, the system 110 may be disposed on a given floor of a building such that the given floor is known. In turn, use of at least three ranging signals may be utilized to determine a two dimensional position of the device 112 with respect to the given floor. However, certain scenarios may exist whereby device 112 within the monitored environment may not have the ability to receive ranging signals from the requisite minimum number of communication nodes for determination of the position of the device 112 using multilateration.

Figure 18:
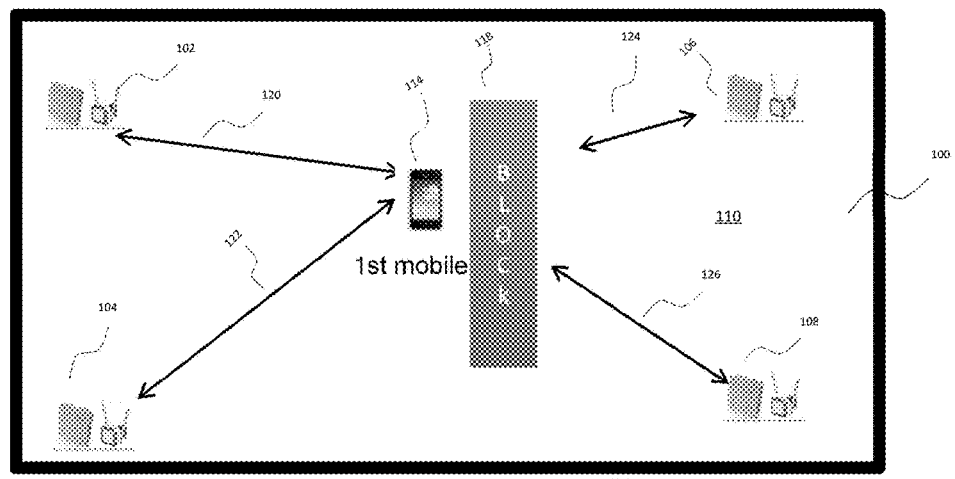
FIG. 18 is an illustration of a scenario in which a mobile device has limited communication ability with the cooperative receivers.

One such example of a scenario in which a device 114 in the monitored environment 100 is incapable of receiving ranging signals from a sufficient number of communication nodes 102-108 for location of the device 114 is depicted in FIG. 18. Specifically, the device 114 to be located in FIG. 18 may only be operative to receive a ranging signal 120 from communication node 102 and a ranging signal 122 from communication node 104. That is, the ranging signal 124 from node 106 and ranging signal 126 from node 108 may be blocked by an impediment 118. For example, the impediment 118 may comprise a structure (e.g., elevator shaft, stairwell, plumbing chase, etc.) that attenuates the ranging signals 124 and 126 below a threshold perceivable by the device 114. Additionally or alternatively, the impediment 118 may comprise one or more devices that result in noise interference that prevents the acquisition of the ranging signals 124 and 126 at the device 114. In any event, the device 114 may be operative to obtain ranging signals from fewer than the minimum number of the communication nodes so as not to be operative to generate a solution for the location of the device 114 using multilateration.

Figure 19:
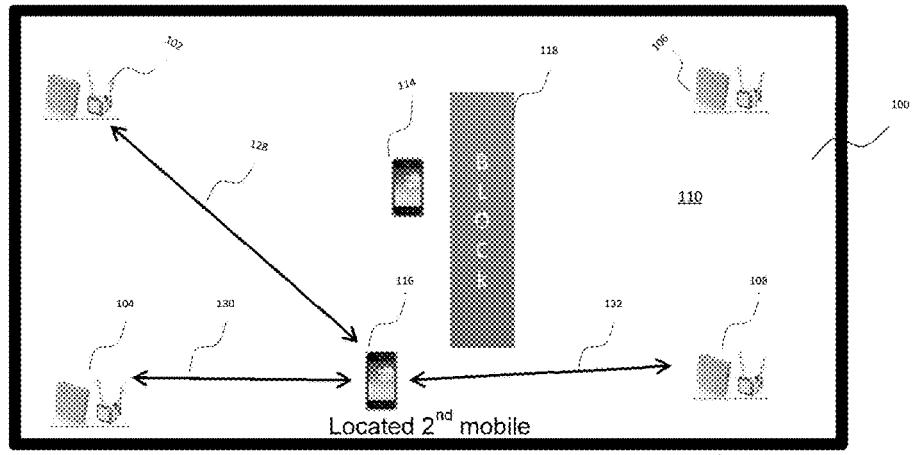
FIGS. 19 and 20 illustrate locating a device with cooperative receivers for use in locating another device with limited communication capability with respect to the cooperative receivers.
Figure 20:
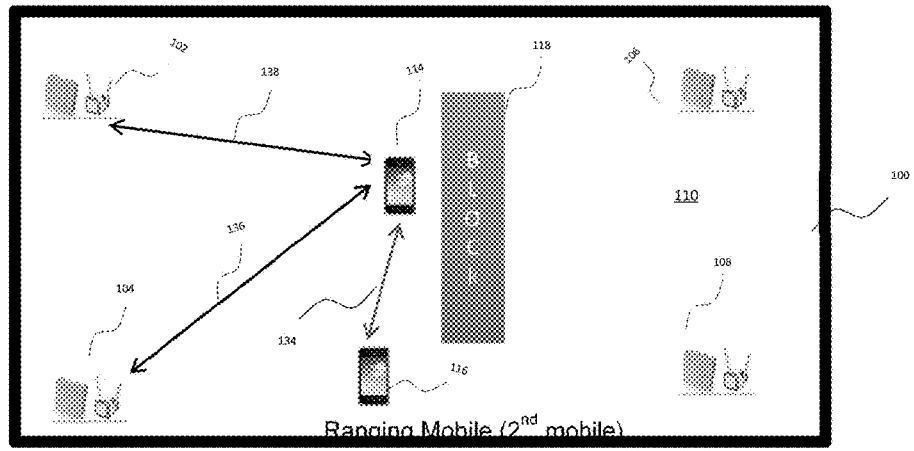

With further reference to FIG. 19, an embodiment of a solution for providing a location to device 114 may be provided by way of use of a second device 116 within the monitored environment 110. For instance, the second device 116 may be a device previously located using multilateration relative to at least some of the communication nodes 102-108 of the cooperative receiver system 100. Alternatively, the second device 116 may be located using a traditional GNSS approach or other approach to derive the location of the second device 116. The second device 116 may be a mobile phone, tablet, laptop, or other device within the monitored environment 110. The second device 116 may be positioned so as to receive ranging signals from a requisite number of commuicnation nodes 102-108 (e.g., at least three for trilateration) or more of the communication nodes 102-108 so as to derive the location of the second device 116 using multilateration. Specifically, the device 116 may be operative to receive a ranging signal 128 from communication node 102, ranging signal 130 from communication node 104, and ranging signal 132 from communication node 108. Using ranging signals 128-132, the location for the second device 116 may be determined utilizing multilateration. In turn, as shown in FIG. 20, the second device 116 may in turn generate a ranging signal 134 by way of communication with the first device 114. Specifically, the ranging signal 134 may be utilized in connection with ranging signals 136 from node 104 and ranging signals 138 from node 102 to provide a location of the first device 114. That is, utilizing approaches for a cooperative receiver system as described herein, previously located devices within a monitored environment served by a cooperative receiver system may be utilized as ranging devices themselves so as to assist in the determination of the location for another device within the monitored environment that is incapable of receiving sufficient ranging signals solely from communication nodes of the cooperative system to provide the location of the device to be located.

In this regard, each of the communication nodes 102-108 may comprise a GNSS receiver as well as a communication device such as, for example, an RF communication device operative to transmit and receive data wirelessly utilizing one of a number anyone of a number of different protocols including for example, LTE, WiMAX, Wi-Fi (802.11), or other RF communication protocols. Furthermore, the communication nodes 102-108 may utilize the cooperative receiver approaches described below provide an absolute position for the cooperative receivers 102-108 relative to a global coordinate system. In turn, devices 112, 114, or 116 located within the monitored environment 110 served by the cooperative receiver system 100 may also be located relative to the absolute global coordinate system. In turn, the devices 112-116 may benefit from the use of location-based services (e.g., including location information for use in the context of emergency services or the like). Notably, the location of the devices 112-116 relative to the global coordinate system may be provided even in the absence of the devices 112-116 themselves being capable of obtaining sufficient number of GNSS signals at the device for accurate location determination. For example, the cooperative receiver system 100 may be disposed within a building such that difficulties associated with receipt of GNSS signals within the building may be present. Specifically, attenuation, multipath reflectance, noise, or other difficulties as described in greater detail below may be present when attempting to receive a GNSS signal at the devices 112-116 directly. However, utilization of the cooperative system 100 as described herein may be utilized to provide an accurate location determination of the devices 112-116 relative to a global coordinate system.

Furthermore, it may be beneficial to synchronize the communication nodes of the cooperative system 100. For instance, with further reference to FIG. 21, communication node 104 and 108 may use direct RF communication to pass a synchronization signal 154 between the nodes to synchronize the clocks of the two communicating communication nodes 104 and 108. This may include synchronization with respect to a phase and a frequency of a local clock at each respective communication node 104 and 108. For instance, the communication nodes 104 and 108 may each be synchronized relative to a global time reference such as UTC in the case of a GPS system. Much like the ranging signals described above, these synchronization signals may be dedicated signals exchanged for purposes of synchronization or may be associated with data signals exchanged between the nodes that are also used for synchronization purposes.

Figure 21:
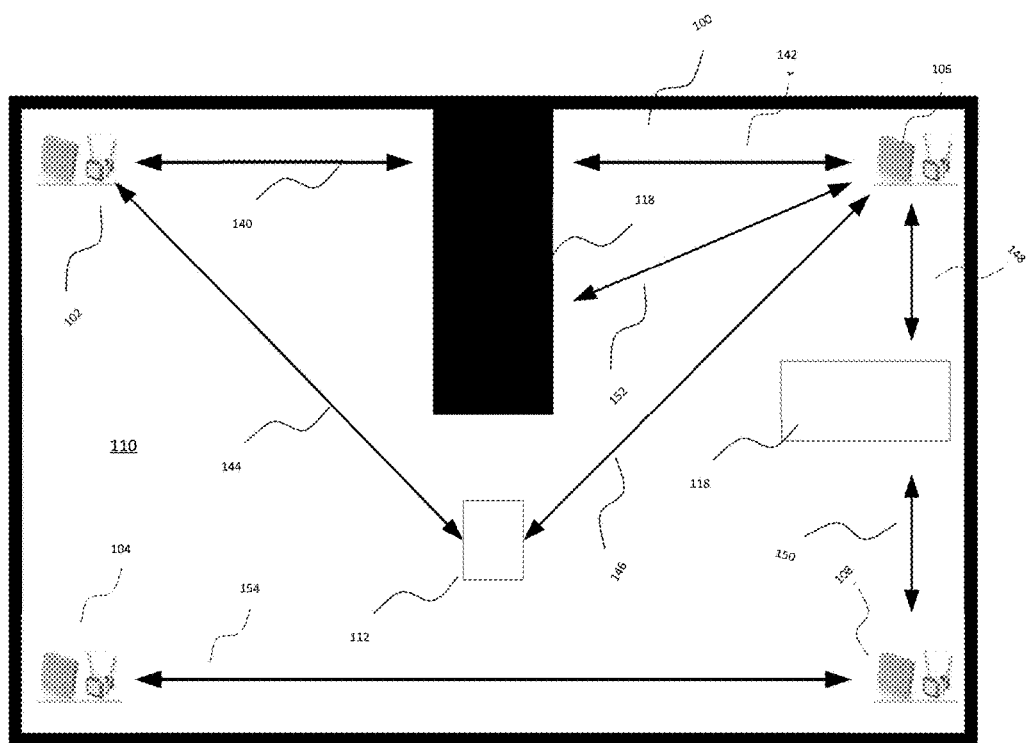
FIG. 21 illustrate use of an intermediary device to provide a synchronization signal between cooperative receivers without direct communication between the receivers.

However, an instance is depicted in the case of communication node 106 whereby direct communication with other nodes in the system may not be possible for purposed of exchanging synchronization signals. Specifically, as shown in FIG. 21, impediments 118 may be present between node 106 and all other nodes such that none of the synchronization signals directed to (e.g., synchronization signals 140 or 150) or sent from the node 106 (e.g., synchronization signals 142, 148, and 152) may be exchanged. In this instance, communication node 106 may be in communication with an intermediate device 142. As such, a synchronization signal 144 may be communicated between communication node 102 and the device 142. In turn, the device 142 may exchange a synchronization signal 146 with communication node 106.

The system and approaches described above may use a set of GNSS receivers in cooperation with each other (e.g., at each communication node to determine the location of each communication node). The cooperating receivers first conduct ranging measurements to each other to determine the distance to each other and establish the relative geometry of the cooperating receivers. Then, the cooperating receivers may compute pseudoranges and correlation values for each of the GNSS satellites available to them. These pseudoranges/correlation values may be sent either to each other or to a central server where they are combined to generate a single solution for the location of the coordinated system. This solution is then translated back to each receiver using the known geometry or relationship to each other. The geometry may be rotated and optimized to concur with the best GNSS solution of the group to provide an absolute position for each of the GNSS receivers of the system.

Figure 15:
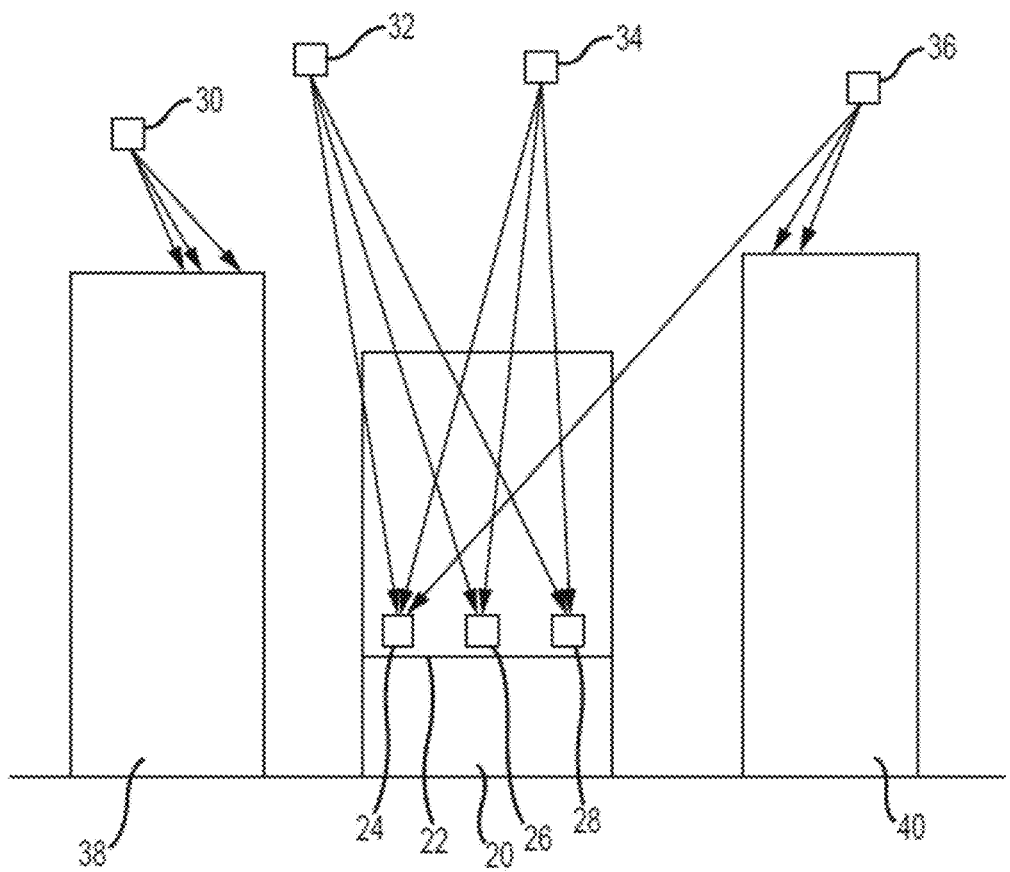
FIG. 15 is a simplified illustration of three receivers located on a floor of a building located proximate to two taller adjacent buildings, and further showing issues related to the reception of signals from multiple GNSS satellites.

FIG. 15 provides a simplified illustration of a geometry that may exist in a building 20. Located on a particular floor 22 of the building 20 are GNSS receivers 24, 26, and 28. Multiple GNSS satellites or space vehicles may be located in the sky above the building 20. These may include satellite 30, satellite 32, satellite 34, and satellite 36. However, since buildings 38 and 40 are located proximate to building 20, some of the receivers 24, 26, and 28 on floor 22 of building 20 are in the shadow of those adjacent buildings 38 and 40 with respect to certain ones of the satellites. For example, the direct path from satellite 30 to each of the receivers 24, 26, and 28 would pass through building 38 (so that the direct signal that is received by the receivers 24, 26, and 28 may be so attenuated as to be below the sensitivity level of the receivers). On the other hand, the direct rays from satellite 32 are not blocked by either building 38 or 40 and only pass through a portion of the structure of building 22 before arriving at receivers 24, 26, and 28. Note that the direct ray from satellite 32 to receiver 24 only passes through a small portion of the building 20, so this may be a relatively strong signal received by receiver 24. Similarly, the direct ray from satellite 34 to each of receivers 24, 26, and 28 does not pass through either building 38 or 40. Lastly, the direct rays from satellite 36 to receivers 26 and 28 pass through and are largely attenuated by building 40 and so they may be below the sensitivity level of receivers 26 and 28. However, the direct ray from satellite 36 two receiver 24 does not pass through buildings 38 or 40 and is likely to be above the sensitivity level of receiver 24. Note that this is a simplified diagram that leaves out multiple real-world aspects. For example, there may be more GNSS satellites that are visible to one or more of the receivers. Typically, there are also reflected rays off adjacent buildings that are received by the receivers.

Figure 16:
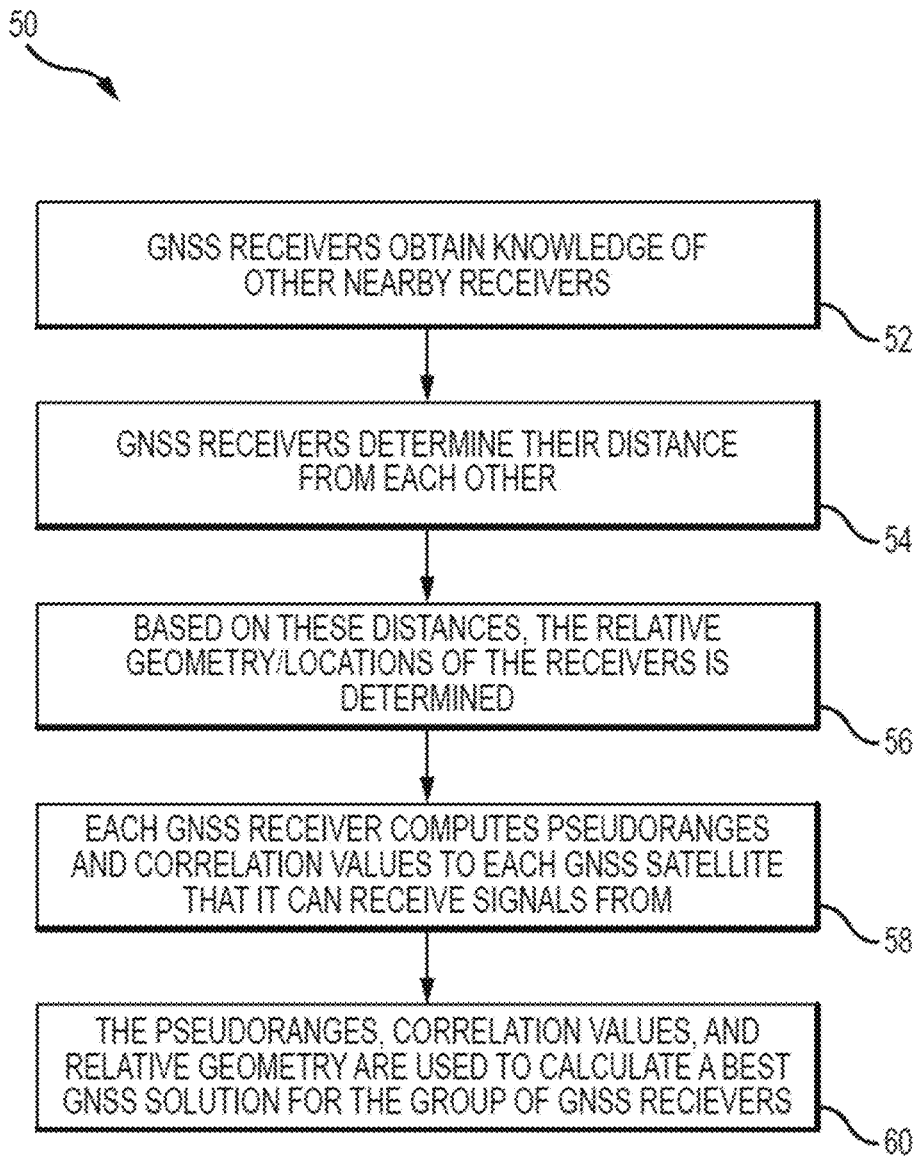
FIG. 16 is a flow chart of certain techniques taught herein.

A high-level flowchart 50 of the techniques taught herein is provided in FIG. 16. GNSS receivers are able to obtain (52) knowledge of other nearby receivers. This may include receivers located on the same floor of a building or it may possibly include one or more receivers located on adjacent floor of a building. The GNSS receivers are able to determine (54) their distance from each other. Details on how this can be done is provided below. Based on these distances, the relative geometry/locations of the receivers is determined (56). This determination can be made by one or more of the receivers individually, as a group, or by a separate processor in communication with one or more of the receivers. Each GNSS receiver is able to compute (58) pseudoranges and correlation values to each GNSS from which it can receive satellite signals. The pseudo ranges, correlation values, and relative geometry are used to calculate (60) a best GNSS solution for the group of GNSS receivers. As with operation 56 described above, this operation 60 can be performed by one or more of the receivers individually, as a group, or by a separate processor in communication with one or more of the receivers.

Figure 3:
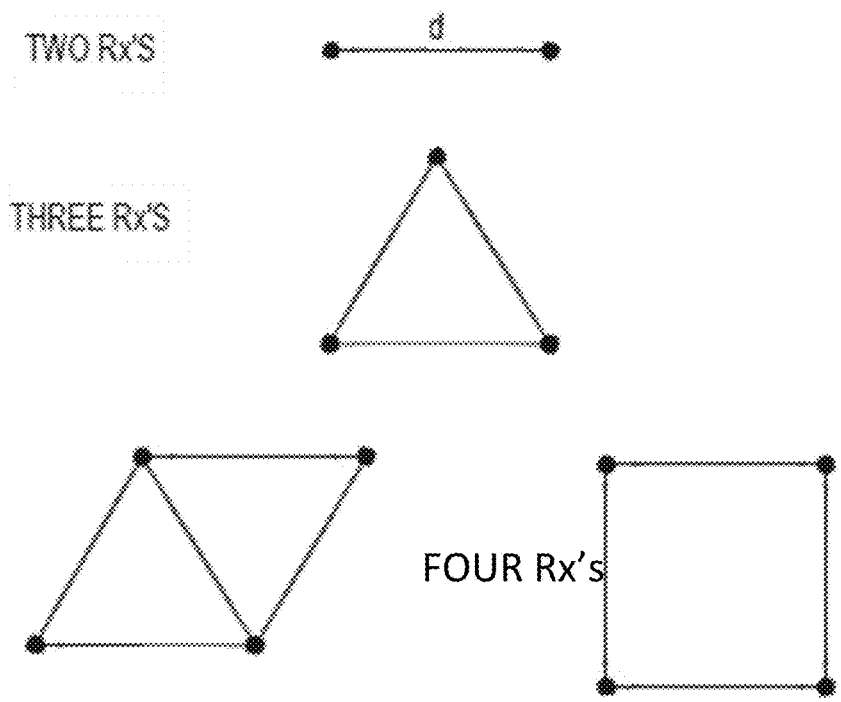
FIG. 3 is an example of some small cell geometries for groups of two receivers, groups of three receivers, and groups of four receivers.

The cooperative receiver architecture includes the GNSS cooperative receivers being arranged on any floor of a building in a way to provide small cell coverage for users on the floor. In this way, they form a geometry on the floor described by their separation from each other. Three prevalent geometries (as shown in FIG. 3) are two GNSS Receivers in a line, three GNSS Receivers in a triangle, and four GNSS receivers in a set of triangles or in a square (or other quadrilateral) as indicated below. The shaded area is the floor of the building on which the receivers are located. These are shown as symmetrical layouts or geometries but this is not necessary. Further, although the receivers are described as being on the same floor, the techniques discussed herein could be applied when the receivers are on different floors within a reasonable distance of each other.

Figure 4:
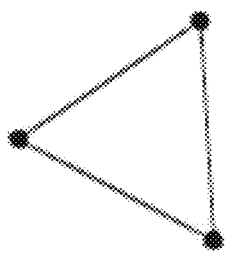
FIG. 4 is an example of three GNSS receivers with a known relative relationship but unknown true positions.

Next, the distance from cell to cell is measured and the geometry determined. For example, in the case of three receivers, if the distance from each receiver is known, then it is a routine matter to generate the triangle that describes the receiver relationships. However, the exact orientation and positions within the building will not be known until the GNSS locations are calculated. The orientation problem is indicated in FIG. 4 for three GNSS Receivers with correct relative spacing but unknown true position.

The distance from receiver to receiver can be determined in many ways. Three are described below. The distance from receiver to receiver can be measured with wireless technology. This could be Wi-Fi ranging from receiver to receiver as is done today for mobile location, it can also be an LTE signal or other RF signal. Furthermore, as described above, the ranging between two receivers may be provided by way of an intermediary device (e.g., in an instance where the GNSS receivers are incapable of direct communication). The distance can be measured by the propagation time over a wired link receiver to receiver such as the Ethernet link receiver to receiver using IEEE 1588v2 (PTP) or some other protocol. This will be less accurate than wireless since there will be unknown cable lengths associated with the wiring in walls, floors and the like. It can be a predetermined placement pattern such as: all receivers across all floors have the same geometry, and measurements are only needed once or not at all.

Figure 5:
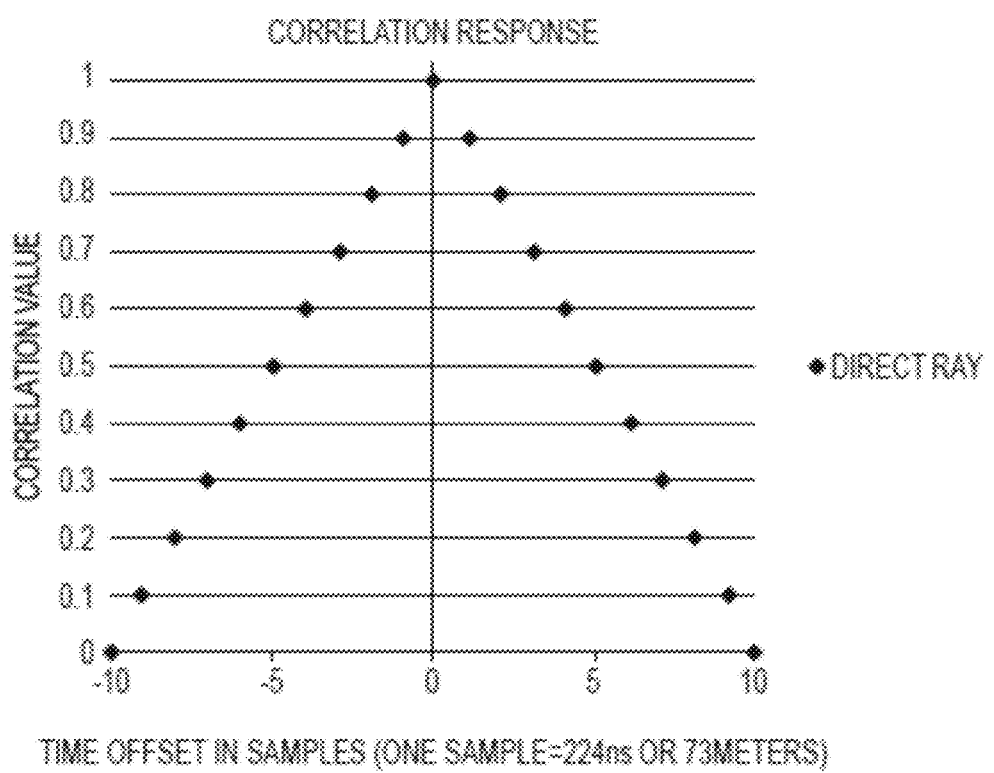
FIG. 5 is a graph of noiseless correct direct ray correlation.

Next, GNSS measurements are performed from each GNSS receiver to each satellite in view. The measurements result in candidate correlation time offset values and Doppler bins. In the ideal case of low noise and no reflections or diffractions, the correlation response in the ideal Doppler bin will look triangular with the peak value defining the correct time offset at time offset zero from true time as seen in FIG. 5.

The GNSS receiver will pass the top correlation values and time offsets for the top five to ten values across sample time and Doppler offsets, in this case offsets −2 samples to +2 samples in the ideal Doppler bin, to the GNSS computation engine and/or other GNSS receivers to cooperate in the GNSS solution.

Figure 6:
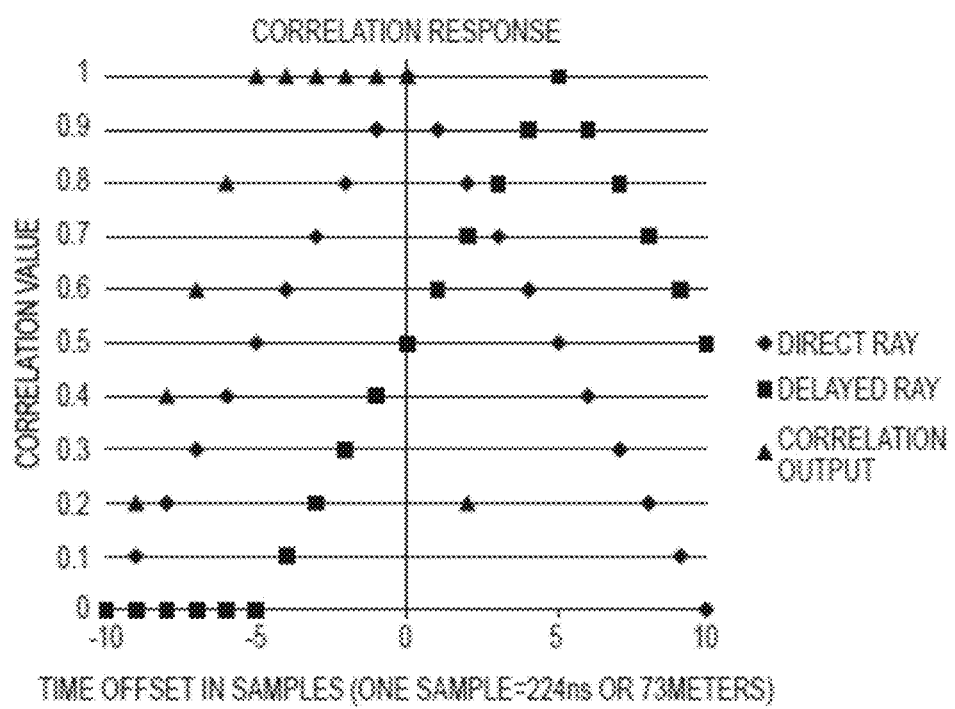
FIG. 6 is a graph of actual noiseless correlation output with direct and delayed rays.

In the case of a delayed ray due to reflection or diffraction, a second response will add to the correct response. FIG. 6 shows the direct or correct ray response in diamonds and the delayed response in squares, all in the ideal Doppler bin for simplicity. Note that the correlator cannot compute these responses separately, rather a composite correlation output is generated, as seen in the triangles. This example is generated with the delayed ray out of phase with the direct ray which means the responses from the rays are subtracted from each other, rather than added together. This makes it appear that the correct correlation value is earlier than the true one at time 0 sample in FIG. 6. The composite response (the triangles) has no clear correct peak value. It certainly is not the first peak at time equal to −5, although one is tempted to declare that the correct peak, because the others are delayed, but that is wrong in this case.

Figure 7:
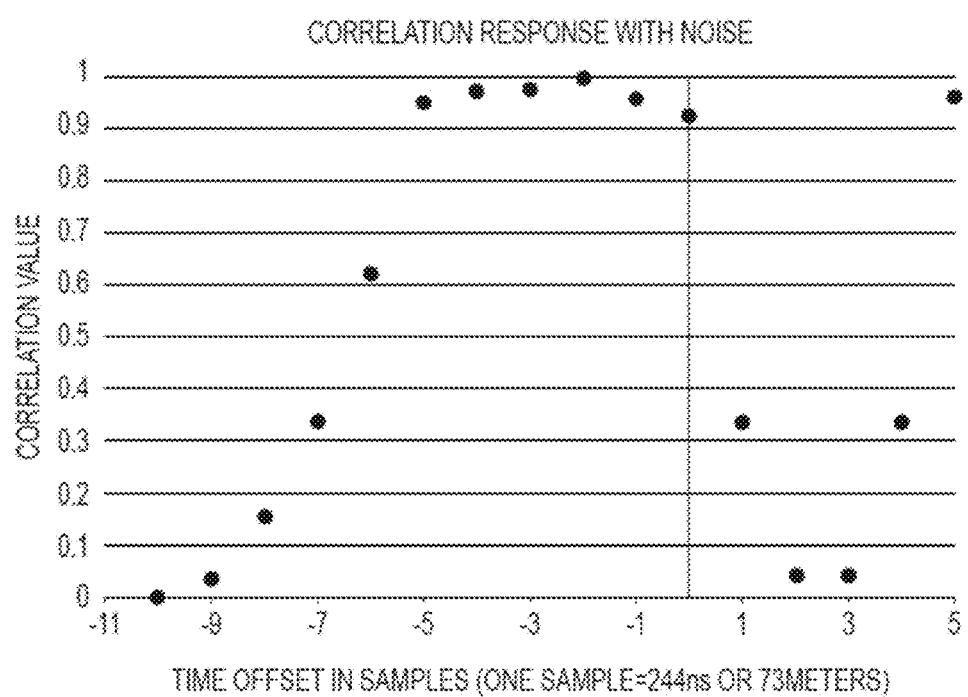
FIG. 7 is a graph of actual with noise correlation output with direct and delayed rays.

Next, the output correlation values are generated for the direct and delayed rays, but with noise added, as shown in FIG. 7. With noise added, it is clear that the correct correlation value at zero offset can have a lower correlation value than the largest at −2, an incorrect one. To allow for a correct decision all six top values and offsets are passed to the cooperative GNSS engine. Then the GNSS engine, using the responses from the other receivers in cooperation, generates an optimum result and the correct offset value is identified and the correct location solution generated.

In addition to GPS, this also applies to other GNSS constellations and signals such as the European Galileo GNSS E5A BOC code and the GPS L1C. This code is a method which has the characteristic of shifting the spectrum off center frequency by plus or minus a 'determined amount,' resulting in a dual spectrum peak symmetrical around the center frequency. It still results in a single optimum time correlation value. Of course, code in this case refers to the pattern modulating the carrier frequency (similar to Gold Codes used in GPS).

For the GNSS solution, it is assumed that the receivers can range each other's distance (pairwise at least on the same floor as indicated above). The ultimate goal is to relate the measurements of non-anchor receivers to those of the anchor; this is equivalent to offsetting the true position of the satellite whence the non-anchor measurement was made by the vector between from the non-anchor receiver to the anchor. If we had two receivers: A (anchor) and B on the same floor, and we knew the distance between A & B, then we know the exact location of B relative to A up to an overall rotation about A on the ground.

Figure 8:
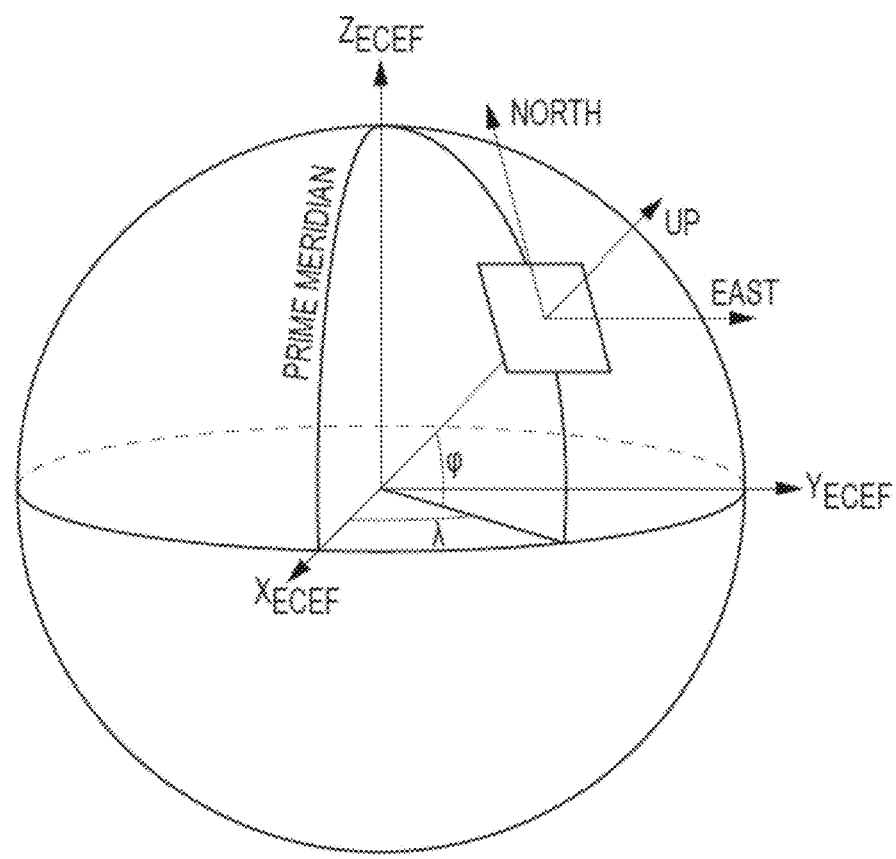
FIG. 8 is an illustration of the ENU coordinate system.

To compute the ENU coordinates (shown in FIG. 8), the geodetic normal U to an (a priori) anchor position P is computed. Then, the north pointing vector is computed (N=Z −projU Z), and the East pointing vector is computed (E=N×U). By calculating the transformation between local coordinates in the local East, North, Up (ENU) frame, one can shift the satellite positions (in the WGS84) frame so that the measurements from B will be consistent with their having been received by receiver A. This linear transformation can be calculated using an a priori position of A which need only be good to about 1 km.

To discover the correct rotation angle, one can apply different rotation hypotheses (offline on a server) and for each hypothesis, one can look at the residuals (e.g., see U.S. patent application Ser. No. 14/285,770, entitled JOINT PROCESSING OF GNSS PSEUDORANGE SIGNALS, the entire contents of that application being incorporated by reference herein). The joint processing of the data from these receivers will produce a position P and a set of biases. For each measurement, there will be a residual error to the best fitting Puser and bias (Bias). For a given satellite, the residual R, is given by $$R=\|P\text{user}-P\text{sat}\|-(\rho+\text{Bias}) \quad (1)$$

where it assumed the pseudorange ρ has been adjusted for satellite clock and drift, atmospheric effects, and earth rotation effects.

The root-mean-square of these residuals will yield a goodness-of-fit; the rotation angle with the lowest residual error will yield the correct orientation on the local plane. Note that Psat for satellites used by receiver B will be modified by the vector offset in WGS84 coordinates corresponding to the angle and distance of B to A in the ENU frame.

Figure 9:
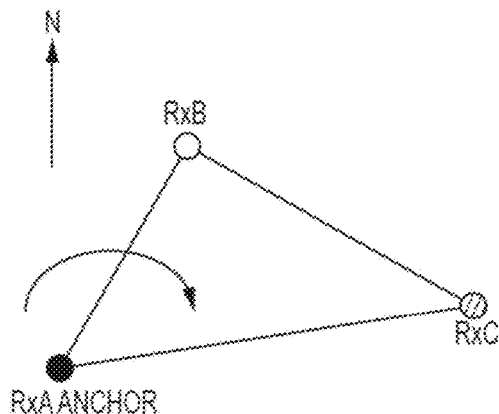
FIG. 9 is a first possible configuration for receiver A, receiver B, and receiver C.
Figure 10:
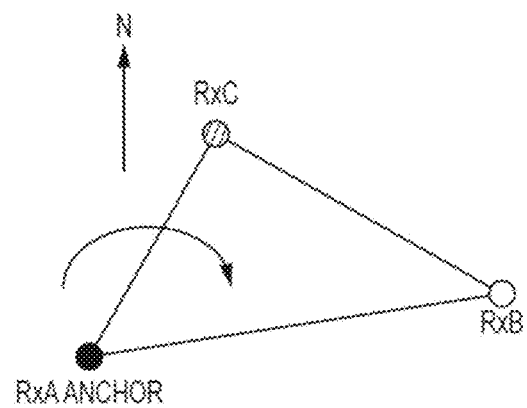
FIG. 10 is an alternate configuration to that of FIG. 9, with the positions for receiver B and receiver C swapped.

If there are 3 receivers: A (anchor), B, and C, whose pairwise separations are known, then their displacements are known up to a rotation about A on the plane with two scenarios:

That is, for a given rotation angle about A, there is a possible flipped scenario for the receivers' positions (as shown in FIGS. 9 and 10). By performing the same procedure as in the two receiver case, one can relate all the measurement to the anchor A's frame and by performing (offline on a server) the test on residual of different rotation hypotheses, one can find the correct orientation of receivers B and C relative to A.

The case with 4 or more receivers can be reduced to that of 3 by picking subsets of 3 receivers as above. Note also that in the above process it is NOT assumed that the receivers' clocks are synchronized. Once the anchor's WGS84 position is computed, the rest of the receivers' positions in WGS84 can also be computed by applying the known ENU deltas mapped back into the WGS84 frame.

There are multiple variations on these techniques:

1) This can also be done without identifying true north initially. Rather, an arbitrary vector in the plane is chosen and then the rotations are done with respect to this arbitrary zero degree reference. This is of course necessary when in the vicinity of the kernel of the transformation—namely near the north or south poles.

Figure 11:
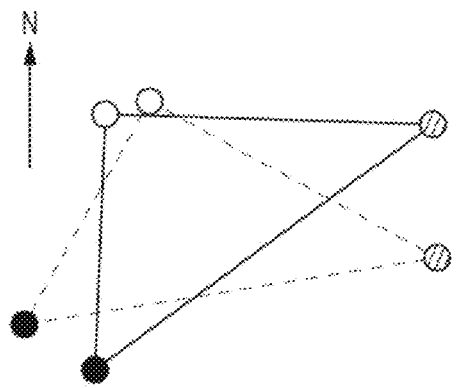
FIG. 11 is an illustration of the final positions determined with the best GNSS solution using a centroid as an anchor.

2) Rather than select a single Rx as the anchor, a geometry orientation is assumed using the triangular configuration as above (or some other suitable configuration). Then each Rx's correlation values/pseudoranges are translated according to the configuration to the geometric center (the centroid) and the location is calculated and the location and residual error is stored. The configuration is then rotated x degrees around the assumed center and the location and residuals are calculated again. This is repeated for 360 degrees. The best fit is determined from the lowest residual. After the rotation yielding the smallest residuals is found, the final locations are indicated in FIG. 11 where the dotted line triangle are the initial positions and the solid line gives the final position and orientation of the receivers after rotating about the centroid.

3) An alternate way to determine initial orientation that may be available is to arrange the receivers according to signals received. If a receiver has high signal levels from satellites on the East, then a good estimate of the position of the receiver is on the East side of a building. Similarly, if a receiver gets a high signal level from the Southwest then the receiver should be positioned towards the SW and so on. From these satellite directions to the receivers, the orientation of the receivers can be estimated.

Discussed above is the use of a joint processing technique in relation to determination of the orientation of a system relative to an absolute coordinate system using a minimization of residual error. However, it may be appreciated that using such an approach may introduce an additional variable dimension with each observation set, namely a unique bias value for a given observation. As this bias value is also unknown, the introduction of the bias parameter with each new set of observation data (i.e., a set of pseudoranges) may add complexity to the calculation of the residual error for each orientation tested. While the system may remain over-constrained such that a solution may be derived, the processing complexity of such an approach may be disadvantageous as an additional variable is introduced into the system with each set of observables introduced into the set of equations used to derive a solution.

Accordingly, in an alternative approach a vector between two nodes may be determined in a manner that may improve the calculation processing required to derive a solution. That is, the approach described herein may use an iterative convergence system to determine the vector between an anchor node and a rover node in the system. By solving for the vector between the anchor node and any given other node in the system (designated a rover node), the orientation of the nodes may be determined where the relative orientation between all nodes is known.

In the context of position determination, approaches that use iterative convergence (e.g., Newton-Raphson type approaches) may be used to resolve a location. Specifically, in the context of GPS solutions, a unit vector between the space vehicle and the device to be located may be defined. Such a unit vector may be calculated based on the information encoded in the GPS signal received from the space vehicle. Specifically, a variable $d\cos_n$ may be defined for any device relative to a given space vehicle n that represents the unit vector between the space vehicle and the device. Specifically the unit vector d $\cos_n$ may be defined as:

$$dcos_n = \frac{(x - sat_n(x), y - sat_n(y), z - sat_n(z))}{|(x - sat_n(x), y - sat_n(y), z - sat_n(z))|}$$

where x is the position in the x dimension of the device, y is the position in the y dimension of the device, z is the position in the z dimension of the device, $sat_n(x)$ is the position of space vehicle n in the x dimension, $sat_n(y)$ is the position of space vehicle n in the y dimension, and $sat_n(z)$ is the position of space vehicle n in the z dimension. The division by the absolute value of the quantity in the denominator is a convention to address sign convention of the variable d $\cos_n$.

As may be appreciated for each set of observables, a new location of the device may be determined. Presumably, upon improved resolution of the position of the device, the accuracy of the calculation based on new observables will improve such that each successive solution will tend to converge to an actual determined location for a device. In any regard, the difference between a prior determined position and a subsequent solution position may be defined as:

$dy_n = \text{pseudo}_{range} - \text{predicted}_{range}$ where pseudo$_{range}$ may be equated to d $\cos_n$ for any given observable set from the positioning system. Additionally, the variable predicted$_{range}$ may be defined as:

predicted$_{range} = sv_{n\ dist}(X)$ where X is the a priori position determined in a previous epoch and defined in the (x,y,z) dimensions of the system. Moreover, a variable for the receiver clock bias b may be defined for each set of observables in a given epoch. In turn, a system of equations may be defined as follows:

$dy_k = d\cos_k \cdot dx + b,\ k=1,\ldots,n$

That is, $dy_k$ is the dot product of the unit vector d $\cos_k$ to each space vehicle k for space vehicles 1 to n. Additionally, dx is the vector between the a priori position and the new location solution. During a given epoch, a set of observables $H_n$ may be received that may comprise pseudoranges from at least four satellites in the epoch. In turn, dx may be solved for using the observables $H_n$. Once dx falls below a given threshold, the solution may be said to have converged such that a location determination is made. That is, once the vector between an a priori determined location and a subsequent determined location falls below the threshold, then the system may be said to have converged.

A similar approach may be applied to determine dx, which is defined as the vector between an anchor node and a rover node rather than defined as being between an a priori determined location and a subsequent determined location. In turn, where the anchor node and the rover node has at least one common satellite view (assuming clock synchronization between the anchor and the rover nodes), the vector dx may be determined, which provides information regarding the orientation of the modules.

For instance, with returned reference to FIGS. 9-11, any given node may be determined to be an anchor node (e.g., RxA) and any other node may be determined to be a rover node (e.g., RxB or RxC). For each anchor node and rover node, a vector extending between the nodes dX may be defined. As may be appreciated, solving for the vector dX may provide information regarding the proper orientation between the anchor node and a rover node. Moreover, as all geometries between every node of the system may be known, other rover nodes other than the specific rover node used in the determination of dX below may also be determined. Further still, a position of a system may be determined by setting a given node in the system as a rover node and using a reference station (e.g., a real or virtual GPS reference station of a known location) as an anchor node. In this regard, resolving dX relative to the known location of the anchor node may establish a location of the system. In turn, processing as described above, wherein the system is initially located in relation to the reference station and thereafter oriented with use of nodes within the system as anchor and rover nodes.

In any regard, as the anchor node position may be known, a value posA may be established corresponding to the three dimensional (e.g., x, y, z coordinates in any given local or global coordinate system) position of the anchor node. Additionally, an unknown value posR may be established corresponding to the unknown position of the rover node. This value of posR is unknown because any pseudorange calculated from a space vehicle to the rover node may be subject to an unknown bias. Thus, while pseudorange information may be known for the rover node, the pseudorange may include an actual position modified by a bias that is unknown as will be demonstrated below. Specifically, pseudoranges corresponding to known or measured locations (e.g., measured from a space vehicle or the like) may be defined. Specifically, pseudoranges may be established for the anchor defined as:

pseudorange$A1 = sv1_{dist}(posA) + biasA$ pseudorange$A2 = sv2_{dist}(posA) + biasA$ where $sv1_{dist}(posA)$ is a distance from a first space vehicle to the known posA, $sv2_{dist}(posA)$ is a distance from a second space vehicle to the known position posA, and biasA is the clock bias of the anchor node. Similarly, a number of pseudoranges may be defined for the rover node:

pseudogrange$R1 = sv1_{dist}(posR) + biasR$ pseudorange$R2 = sv2_{dist}(posR) + biasR$ where $sv1_{dist}(posR)$ is a distance from a first space vehicle to the unknown posR, $sv2_{dist}(posR)$ is a distance from a second space vehicle to the known position posR, and biasR is the clock bias of the rover node.

Thereafter a value corresponding to the differences of the observation vectors to the first and second space vehicle can be established for the anchor node. This may be established as unit vectors d cos as follows:

$d\cos A1 = (sv1_x - posA(x), sv1_y - posA(y), sv1_z - posA(z))/\text{length}(d\cos A1)$ $d\cos A2 = (sv2_x - posA(x), sv2_y - posA(y), sv2_z - posA(z))/\text{length}(d\cos A2)$ $$dcosOut(i) = \frac{dcosA1(i)}{|dcosA1|} - \frac{dcosA2(i)}{|dcosA2|}$$

where $sv1_x$ is the x component of the vector between the first space vehicle and the anchor node, $sv1_y$ is the y component of the vector between the first space vehicle and the anchor node, $sv1_z$ is the z component of the vector between the first space vehicle and the anchor node, $sv2_x$ is the x component of the vector between the second space vehicle and the anchor node, $sv2_y$ is the y component of the vector between the second space vehicle and the anchor node, $sv2_z$ is the z component of the vector between the second space vehicle and the anchor node, posA(x) is the position of the anchor receiver in the x dimension of the coordinate system, posA (y) is the position of the anchor receiver in they dimension of the coordinate system, and posA(z) is the position of the anchor receiver in the z dimension of the coordinate system.

Thereafter, the difference of the pseudoranges between the anchor node and the rover node relative to the first space vehicle and the difference of the pseudoranges between the anchor node and the rover node relative to the second space vehicle may be equated to the direction cosine differences to the first space vehicle and the second space vehicle as derived above for the anchor node of a known location. In turn, the equation:

(pseudorange$R1$-pseudorange$A1$)-(pseudorange$R2$-pseudorange$A2$)=$d$ cos Out·$dX$ may be written where d cos Out·dX is the dot product of 1) the unit vector differences to the first space vehicle and the second pace vehicle and 2) the vector dX between the anchor node and the rover node. In turn, dX may be solved for in view of the observations to the first and second space vehicle. Moreover, even when accruing and processing many observations, the unknown variables do not grow as in the joint processing model described above as the bias values are negated in the differentials established in the equation above.

Moreover, to further speed processing and provide efficiencies in the calculations a Kalman filter or Recursive Least Squares filter may be utilized in connection with the foregoing calculations. In turn, even if many observation data sets are present (e.g., hundreds or more), the computation may be efficiently performed, thus allowing for improved accuracy in view of the many observations.

Figure 12:
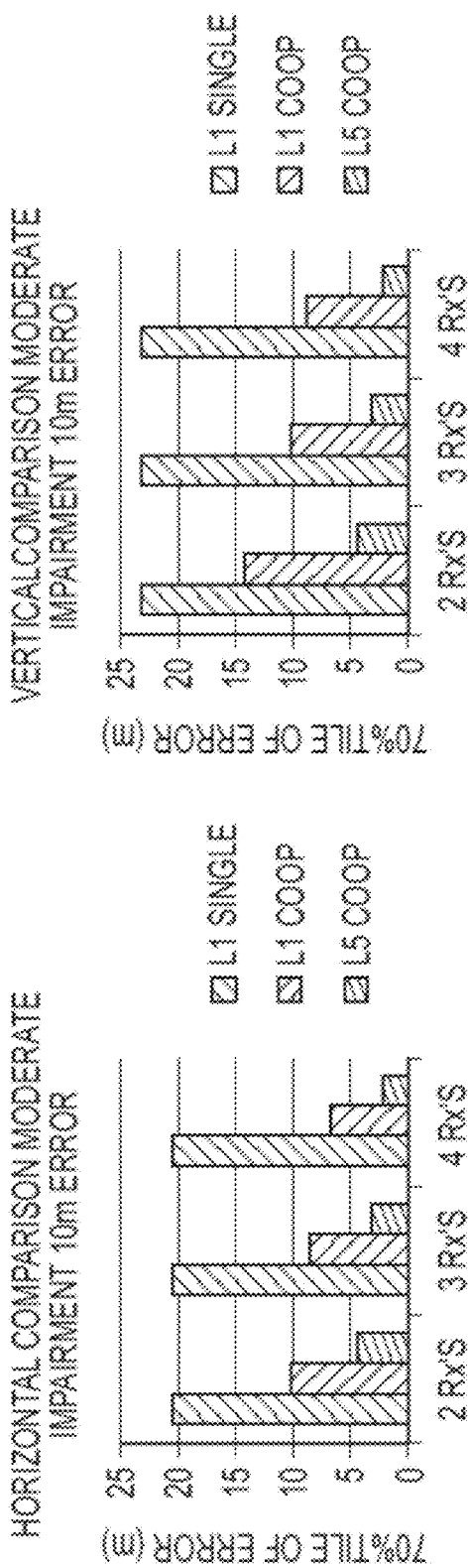
FIG. 12 are graphs of horizontal and vertical error comparison versus the number of receivers, and showing a non-cooperating situation, and cooperating situations for two different kinds of GNSS signals.

Cooperative receiver calculations were conducted for several receiver configurations. These included two receivers in a line, three receivers in a triangle, and four receivers in a square all with a 30 meter distance to their adjacent neighbor. In the case of the square, the neighbor diagonally opposite was 1.414*30 meters away. The simulations were conducted with each receiver measuring correlation values from four SVs; three of them had the correct time offset, and one of them was elongated by 10 meters. FIG. 12 provide the results of cooperative receivers for this configuration. Specifically, it shows Horizontal and Vertical error versus the number and type of receivers that are cooperating.

As is shown, for cooperative receivers, the error reduces dramatically as soon as there are two cooperating receivers, and still further for three and four receivers. We also observe that for GPS L5 frequency, the error is reduced even more than for GPS L1 frequency. The additional improvement is due to the higher signal power which increases the SNR at the receiver and also because the Direct Sequence Spread Spectrum L5 chipping rate is ten times higher than for L1. This means the inherent time resolution is also improved, which improves the distance or pseudorange measurements as well.

Figure 13:
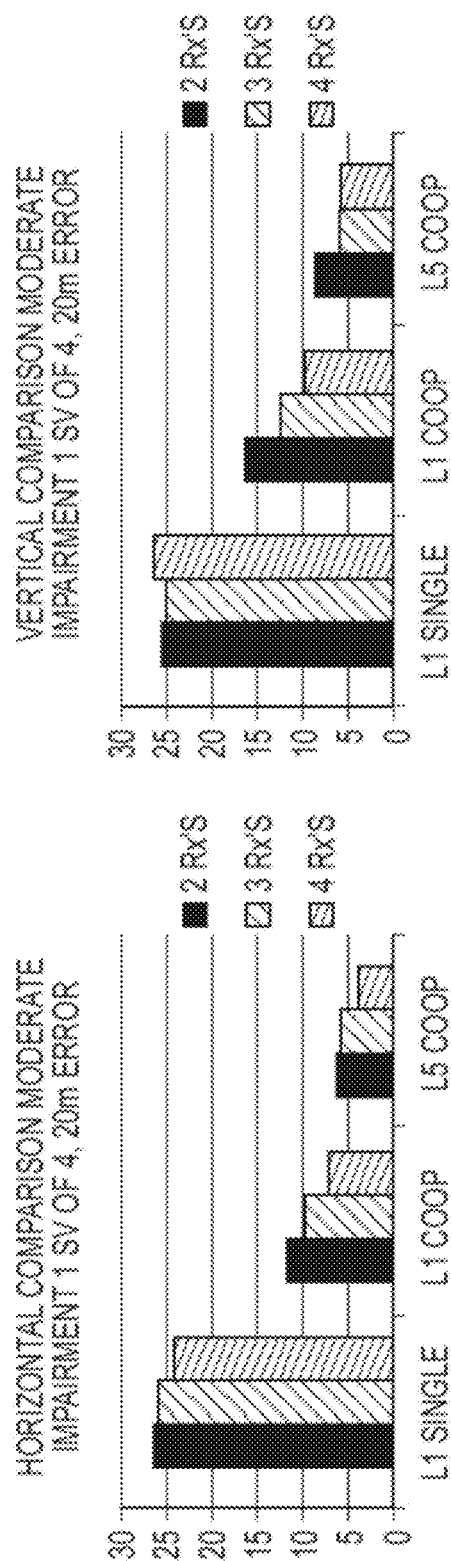
FIG. 13 are graphs of horizontal and vertical error comparison versus the number of receivers in the case where the signals from one of the four visible satellites has a 20 meter error, and showing a non-cooperating situation, and cooperating situations for two different kinds of GNSS signals.

FIG. 13 shows the same analysis but for a different scenario of one SV of the four SVs having a 20 meter error and three SVs have the correct correlation response time, with nearly the same result. This is because the GNSS computation engine can remove the erroneous elongated path length.

Next is discussed experimental results for Horizontal error and Vertical error versus Receiver cooperation. A system was set up using four receivers on the second floor of a two story building at four locations (roughly at the corners of the building) using GPS L1 signals only. The computation results are in the table below.

TABLE 1

Empirical results

|  | Individual Receiver Horizontal error (m) | Individual Receiver Vertical error (m) | Four Rx cooperation Horizontal error (m) | Four Rx cooperation Vertical error (m) |
| --- | --- | --- | --- | --- |
| Receiver 1 SE | 11.96 | 2.3 | 5.17 | 2.5 |
| Receiver 2 NW | 10.33 | 17.38 |  |  |
| Receiver 3 SW | 6.2 | 13.6 |  |  |
| Receiver 4 NE | 4.47 | 8.73 |  |  |

This shows a net improvement in the average horizontal error from 8.24 meters to 5.17 meters and, for the average vertical error, from 10.5 meters to 2.5 meters.

Figure 14:
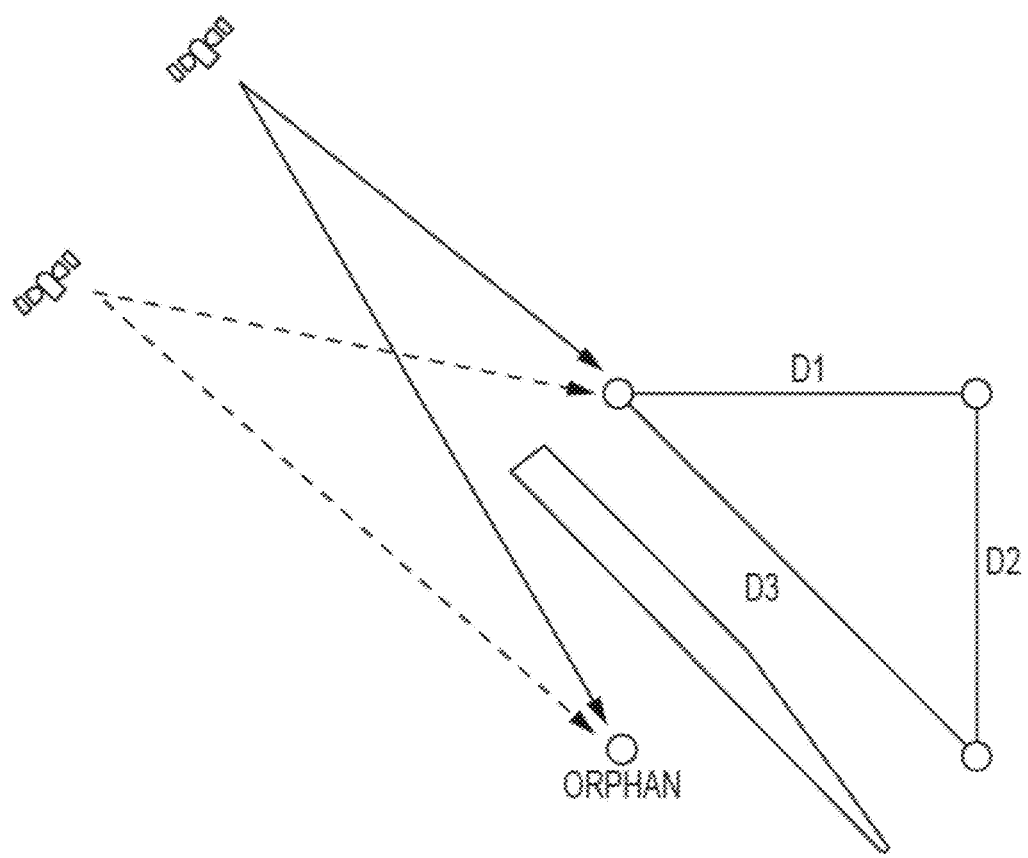
FIG. 14 is an illustration of four receivers, where one of the receivers is an orphan but it and another receiver can see the same two satellites.

There will be cases when the receivers lack the innate ranging capability, or cases where there are sufficient impairments between two receivers such that direct ranging between them is impractical. This will yield an orphan receiver separate from the others in the geometry as seen in FIG. 14. It is possible in these cases that the 'anchor' receiver and another receiver may have enough common view satellites to enable an RTK-like calculation of the baseline vector from the anchor to another receiver. This would allow the local geometry between the receivers to be calculated and the location of the orphan receiver relative to the anchor.

Supposing the anchor position A were known, and that the other receiver receiver's clock was synchronized to that of the anchor's (e.g., via IEEE 1588 v2). If they both observed a satellite $S_i$ then one could measure the difference in pseudoranges $\Delta r_i$ these two receivers and linearize these as:

$$\Delta r_i = \|S_i - A\| - \|S_i - (A + \delta x)\| \approx (S_i - A)/\|S_i - A\| \cdot -\delta x \quad (2)$$

Where $\delta x$ is the baseline vector from the anchor to the other receiver.

Then, by observing many common satellites while having the clocks tightly synchronized, one can obtain an overdetermined set of equations, and hence solve for the unknown baseline vector $\delta x$. Note that the time of measurement of each member $\Delta r_k$ in the sequence of measurements $\{\Delta r_i\}$ is immaterial; indeed, these measurements could be spread over days or weeks.

If clocks cannot be synchronized (i.e. there is a bias between a receiver's clock and the master clock), then one can resort to a double differencing technique.

Define d $\cos_i = (S_i - A)/\|S_i - A\|$ i.e. the direction cosine vector to the $i^{th}$ satellite relative to A.

Then the double difference formulation is:

$$\Delta r_i - \Delta r_k = (d \cos_i - d \cos_k) \cdot -\delta x \quad (3)$$

The price, of course is that for any given epoch, two common-view satellites must be observable to both receiver R and anchor A.

While the techniques above may be referred to as using a local anchor to assist an orphan receiver, the techniques can be extended to include a remote anchor (e.g., an anchor reference receiver distant from the current building under consideration). In this case, a central reference anchor receiver is placed in a position for excellent view of the satellites in the vicinity, perhaps in the center of a city with the antenna on the roof of a tall building. This single anchor receiver can serve a wide metro area and provide the reference vector to it and its location as above to an orphan receiver. This can be further extended to serve as the anchor to all receivers and, in essence, considers all receivers as orphans.

It is important to note that the general idea of an anchor receiver providing its location and satellite vector information is key to the RTK system in wide deployment for farming. Unlike farming, where centimeter accuracy is required, this implementation only tries to achieve accuracy in the meter range.

While throughout this document the term receiver has been used, it is intended to apply to any device capable of receiving GNSS signals. This may include dedicated GNSS receivers, smart phones, tablets, laptops, smart watches, gaming devices, and most modern consumer electronic devices. For example, in order to receive GNSS signals, it is typically required to have an antenna, a tuner, and a reasonable oscillator. The GNSS location calculations may be performed in the receiver or in some other processing/computing device.

The techniques described herein could apply to determining the location of an anchor receiver, of a centroid, or of any local reference point. In addition, while specific reference has been made to the ENU and WGS84 coordinate systems, the teachings herein could be applied to any other suitable coordinate system.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A method for synchronization of local clocks for receivers in a cooperative receiver system, comprising:
   determining a location and an orientation of a plurality of receivers of a cooperative receiver system, wherein no one receiver of the plurality of receivers individually receives a sufficient number of positioning system signals to locate the one receiver, and wherein the determining is based on an aggregation of each of the positioning system signals received by the plurality of receivers;
   location a first device in a monitored environment relative to the plurality of receivers based on communication between the first device and each of the plurality of receivers after the determining of the location and the orientation of the plurality of receivers;
   first communicating a first synchronization signal using radiofrequency communication between a first receiver of the plurality of receivers of the cooperative receiver system and the first device;
   generating a second synchronization signal at the first device;
   second communicating the second synchronization signal using radiofrequency communication between the first device and a second receiver; and
   synchronizing a second local clock of the second receiver to a first local clock of the first receiver based on the second synchronization signal.

2. The method of claim 1, wherein the first device comprises a mobile device.

3. The method of claim 1, further comprising:
   synchronizing a third local clock of the first device using the first synchronization signal;
   wherein the second synchronization signal is generated at least in part based on the third local clock of the first device.

4. The method of claim 1, wherein the monitored environment comprises an interior portion of a building.

5. The method of claim 1, wherein the monitored environment comprises a given floor of a building, and wherein the plurality of receivers are disposed on the given floor of the building.

6. The method of claim 1, wherein the plurality of receivers each comprise a small cell data communication device.

7. The method of claim 1, wherein the communication between the first device and the plurality of receivers comprise exchange of RF signals.

* * * * *